United States Patent

[11] 3,601,374

| [72] | Inventor | Roger M. Wheeler |
| | | Tulsa, Okla. 74105 |
| [21] | Appl. No. | 750,040 |
| [22] | Filed | Aug. 5, 1968 |
| [45] | Patented | Aug. 24, 1971 |
| [73] | Assignee | American Magnesium Company, Tulsa, Okla. |

[54] APPARATUS FOR EXTRACTING SOLIDS FROM A GAS STREAM
8 Claims, 3 Drawing Figs.

[52] U.S. Cl. .................................................. 261/62,
    261/DIG. 54, 261/109, 261/112, 261/117, 55/241
[51] Int. Cl. ........................................................ B01d 47/10
[50] Field of Search ............................................ 261/62, 65,
    81, DIG. 54, 117; 55/223, 226, 241

[56] References Cited
UNITED STATES PATENTS

| 1,777,277 | 9/1930 | Lednum ........................ | 261/117 |
| 3,116,348 | 12/1963 | Walker ......................... | 261/V.S. |
| 3,177,634 | 4/1965 | Latham, Jr. et al. ........... | 261/V.S. |
| 3,350,076 | 10/1967 | Crommelin, Jr. .............. | 261/118 |
| 3,406,953 | 10/1968 | Moore .......................... | 261/V.S. |

*Primary Examiner*—Tim R. Miles
*Assistant Examiner*—Steven H. Mankowitz
*Attorney*—Head & Johnson ABSTRACT: This invention relates to apparatus for extracting solids from a gas stream. More particularly, the invention relates to an apparatus for extracting solids from a gas stream including an upright scrubber column defining an internal circular gas flow chamber, inlet and outlet gas conduits connected to the upper and lower ends of the flow chamber respectively, a liquid inlet conduit intersecting the internal circular gas flow chamber tangentially providing means of introducing fluid to wet the surface of the flow chamber, a liquid conduit extending upwardly and coaxially within the flow chamber, and a truncated conical baffle supported at the top of the liquid spray conduit defining an annular passageway between the baffle and the gas chamber, fluid being sprayed upwardly through the baffle in a fountain configuration to engage the downward flow of gas through the scrubbing column. One embodiment of the invention includes a means of varying the elevation of the conical baffle by means exterior of the scrubbing column. Another embodiment of the invention includes means of varying the diameter of the conical baffle.

PATENTED AUG 24 1971

INVENTOR.
ROGER M. WHEELER
BY
Head & Johnson
ATTORNEYS

PATENTED AUG 24 1971 3,601,374

INVENTOR
ROGER M. WHEELER

BY

Head & Johnson

ATTORNEYS

APPARATUS FOR EXTRACTING SOLIDS FROM A GAS STREAM

CROSS-REFERENCE

This disclosure is not related to any pending United States or foreign patent application.

BACKGROUND AND SUMMARY OF THE INVENTION

A frequent problem in the chemical industry is the separation of solid particles entrained in gas streams. This problem which has always attracted considerable interest is even more urgent at the present time due to the increased interest in preventing undue contamination of the atmosphere. Generally there are two basic ways of extracting solid particles from gas streams, that is, the dry process and the wet process. The dry process typically involves the use of electric precipitators or some sort of filter or screening means, such as passing the gas through a dust bag. Another dry process includes the use of cyclonic type separators. The dry processes are usually satisfactory if the entrained solid particles are relatively large, however, they are not very successful when the entrained solid products are small, particularly when the solids are in the submicron range. Electric precipitators are successful in extracting small particles except that they are usually prohibitively expensive when large gas volumes are involved.

The wet separators or scrubbers are usually more effective in extracting solid particles of small dimensions and this invention is directed toward improvements in the wet process. Others have provided scrubbers including means for passing gas through areas in which the gas is contacted by liquids. This invention is more or less in the nature of improvements in the art of scrubbing solids from gas streams are typically characterized by the fact that in order to secure maximum efficiency each such device must be designed and constructed for a specific flow rate. Any change in the flow rate, or other parameters of the scrubbing system, such as changes in gas or liquid pressures, size, weight, and distribution of entrained particles, etc., results in the apparatus functioning at less than its maximum design effectiveness and efficiency.

This invention provides apparatus for extracting solids from gas streams including means of providing increased and more effective contact between the gas stream and the scrubbing liquid without imparting increased back pressure to the gas stream.

Another object of the invention is to provide an apparatus for extracting entrained solids from a gas stream including means of varying the relationship of elements making up the apparatus to achieve maximum extraction effectiveness.

Another object of the invention is to provide apparatus for extracting solids from a gas stream including a conical baffle supported in a venturi configured gas flow chamber in a scrubber column including means externally of the scrubber column of varying the position of the conical baffle to secure maximum effectiveness of the separating apparatus under varying conditions.

Another object of this invention is to provide an apparatus for separating solids from a gas stream including a conical shaped baffle positioned in a gas flow chamber of a scrubber column including means externally of the scrubber column of varying the maximum diameter of the conical baffle to secure maximum effectiveness of extraction of the solid particles under varying flow conditions.

These general objects and more specific objects will be understood by referring to the following description and claims, taken in conjunction with the attached drawing.

DESCRIPTION OF THE VIEWS

DETAILED DESCRIPTION

Figure 1:
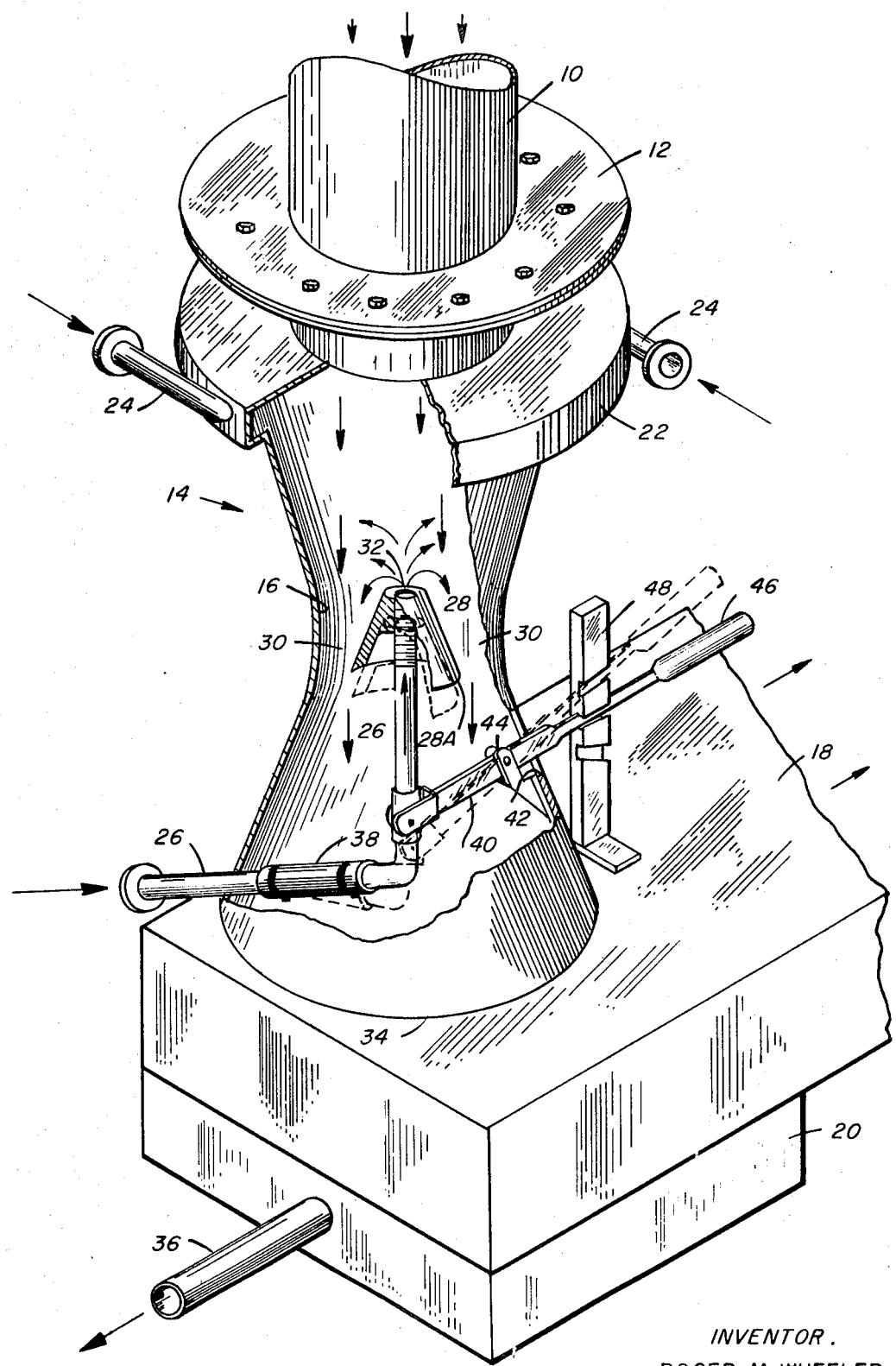
FIG. 1 is an isometric view shown partially cutaway of an apparatus for extracting entrained solids from a gas stream. The view of FIG. 1 shows means of varying the position of a conical baffle relative to a venturi configured gas flow chamber in an upright scrubber column.

Referring to the drawings, and first to FIG. 1, an apparatus for extracting solids from a gas stream is shown. The gas having entrained solid particles is passed downwardly through an inlet gas conduit 10. Conduit 10 is connected to the apparatus of this invention such as by means of a flange 12 which connects to the upper end of an upright scrubbing column, generally indicated by the numeral 14. The upright scrubbing column defines an internal circular gas flow chamber 16. In the embodiment illustrated, and the preferred arrangement, the gas flow chamber 16 is configured in a venturi arrangement, that is, the center portion of the flow chamber is of reduced internal diameter.

Gas having passed downwardly through the scrubbing column 14 passes out through an outlet gas conduit 18. A portion of the outlet gas conduit 18 includes a fluid collecting sump 20.

At the upper end of scrubbing column 14 is an integral enlarged internal diameter liquid inlet portion 22 having one or more tangentially engaging liquid inlet pipes 24. Liquid passes inwardly through pipes 24 and flows around and down the interior sidewall of the gas flow chamber 16. Thus a layer of liquid is formed against wall 16. One of the advantages of the venturi shaped gas flow chamber as illustrated is that the converging flow chamber causes a greater portion of the gas passing downwardly therethrough to engage and commingle with the liquid layer on the side wall.

Extending coaxially upward in the lower portion of the scrubbing column 16 is a liquid spray conduit 26. Secured at the upper end of conduit 26 is a truncated conical baffle 28. The largest diameter 28A of the conical baffle is less than the internal diameter of the venturi configured gas flow chamber 16 so that an annular passageway 30 is provided through which gas flowing through the scrubber passes. The conical baffle 28 is provided by an axial opening 32 therein which communicates with the liquid spray conduit 26 so that liquid forced upwardly through conduit 26 is sprayed upwardly, in a fountain configuration, coaxially within the gas flow chamber of the scrubbing column where it engages the downward flow of gas. This fountain of scrubbing liquid sprayed upwardly is combined with the wetted converging surface of the gas flow column 16 in the reduced area annular passageway 30 causing an efficient and effective commingling of the scrubbing liquid with the gas stream. The scrubbing liquid and commingled gas column pass downwardly and out the bottom end 34 of the scrubbing column. At this juncture a right angle change in the direction of flow occurs, the gas changing direction passes vertically outward through outlet gas conduit 18. The heavier liquid passes downwardly into sump 20 where the liquid, with the solids now entrained therein, is withdrawn through liquid outlet conduit 36.

In the preferred arrangement conical baffle 36 is threadably positioned on the liquid spray conduit 26. By this arrangement the conical baffle 28 can easily be unscrewed and replaced by a baffle having a different configuration and particularly one having a different maximum external diameter so that the area of annular passageway 30 can be varied.

One embodiment of the invention includes means, as illustrated in FIG. 1, for varying the relative elevation of conical baffle 28 relative to the gas flow chamber 16. Liquid spray conduit 26 is provided with a flexible portion 38 which may be in the form of a flexible hose, flexible metallic tubing, flexible slip joint arrangement, or a variety of other means to permit changes in the relative vertical height of conical baffle 28. Affixed to the liquid spray conduit 26 below conical baffle 28 is a lever 40 which extends through an opening 42 in the scrubbing column. The lever 40 is pivoted to the scrubbing column by a pivot arrangement 44 so that by means of handle 46 the elevation of conical baffle 28 may be changed. A notched bracket 48 is illustrated as a means of maintaining the elevation of conical baffle 28 in a preselected position.

It can be seen that pivot 46 and opening 42 may be arranged in a ball socket type pivot to prevent the escape of gas and liquid through opening 42. In addition, the elevation of conical baffle 28 may be varied in a variety of ways, including hydraulic, pneumatic and electric means positioned within the interior lower portion of scrubbing column 14. All such alternate arrangements of varying the elevation of conical baffle 28 relative to the gas flow chamber 16 and conical baffle 14 are within the purview of the invention.

Varying the elevation of conical baffle 28 provides means of materially effecting the operation of the apparatus for extracting solids from a gas stream. As the conical baffle is positioned in elevation so that the maximum diameter portion 28A more nearly aligns with the minimum internal diameter portion of the venturi configured gas flow chamber 16, the area of annular passageway 30 is reduced, increasing the gas and liquid contact. However, the reduced annular area 30 also imposes increased flow restriction to gas passing downwardly through inlet conduit 10. Thus, for any given gas flow rate through inlet gas conduit 10 the elevation of conical baffle 28 can be adjusted so as to secure maximum contact with the scrubbing liquid while maintaining an acceptable pressure drop. This invention thereby provides means whereby an operator can adjust the scrubber to varying gas flow rates, varying liquid flow rates, varying contaminant size particle distribution and so forth for maximum effectiveness and efficiency. In addition, even if preselected gas and liquid flow rates are to be constantly utilized by the scrubber of this invention the provision of means of selectively varying the conical baffle relative to the gas flow chamber 16 provides means of tuning the scrubber for maximum effectiveness and efficiency permitting greater tolerance in engineering design and manufacturing.

Figure 3:
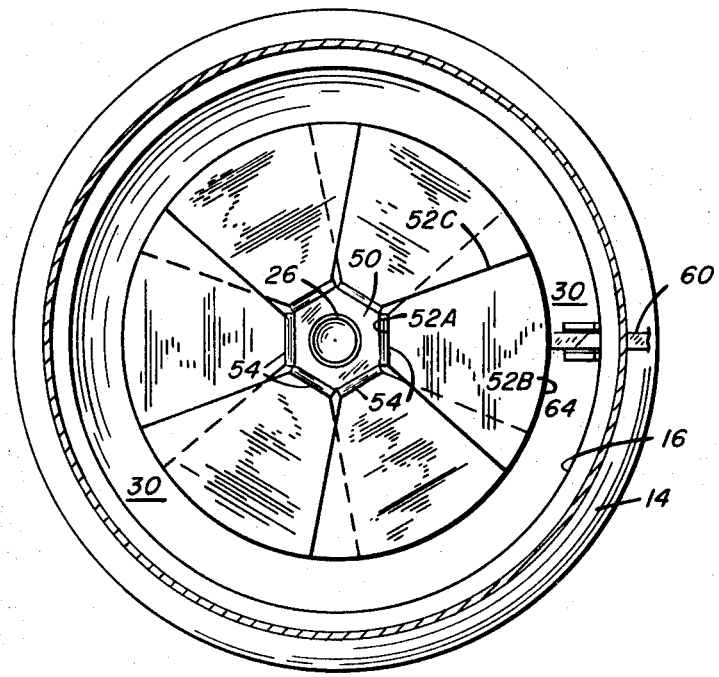
FIG. 3 is a cross-sectional view taken along the line 3–3 of FIG. 1 showing a top view of the conical baffle.
Figure 2:
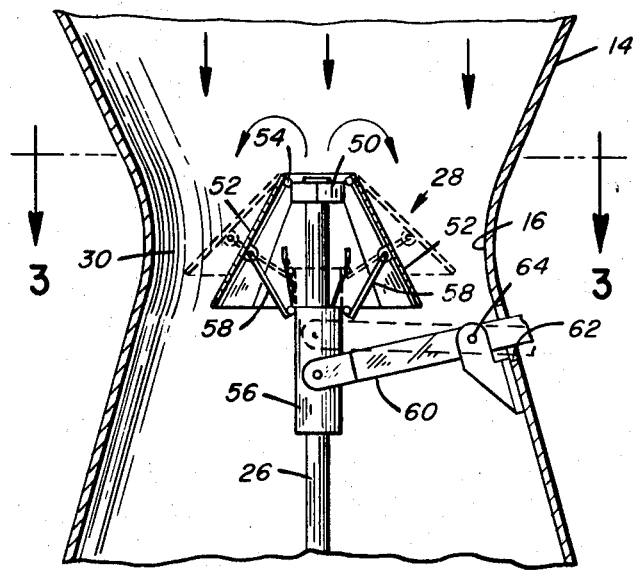
FIG. 2 is a partial cross-sectional view of the gas flow column of FIG. 1 showing an alternate arrangement including means of varying the diameter of the conical baffle member.

Referring to FIGS. 2 and 3, an additional alternate embodiment of the invention is shown. In these views conical baffle 28 is arranged so that its external configuration can be varied by means outside of the scrubbing column. In this arrangement the conical baffle 28 is formed of a base element 50 which is threaded or otherwise affixed to the top of liquid spray conduit 26. The baffle includes a plurality of relatively thin leaf members 52. Each of the leaf members 52 include an upper edge 52A, a lower edge 52B, and downwardly extending sides 52C which diverge outwardly between the upper and lower edges. (See FIG. 3). Thus, each of the leaf members 52 is substantially in the form of a truncated segment of a circle when the lower edge 52B is circular, as shown in FIG. 3.

A hinge 54 pivotally connects each of the leaf members 52 to base member 50. Slidably positioned on the liquid spray conduit 26 is a sleeve 56. Pivotally extending from sleeve 56 and connected to the underneath surface of each of the leaf members 52 is a pivot link 58. A lever 60 extending through opening 62 in scrubber column 14 and pivoted to the scrubber column by pivot 64 provides means of adjusting the effective maximum diameter of the conical baffle. As lever 60 moves sleeve 56 upwardly each of the leaf members 52 is simultaneously pivoted to an increased angle relative to liquid spray conduit 26 so that outer edges 52B form an increased diameter conical base reducing the area of the annular passageway 30. When lever 60 is pivoted to move sleeve 56 downwardly the leaf members are simultaneously drawn inwardly at a reduced angle towards the liquid spray conduit 26 to increase the annular area 30. Thus, the configuration of the conical member defined by overlapping leaf members 52 can be varied according to the conditions within the apparatus, such as the gas flow rate, liquid flow rate, contaminant size distribution, and so forth. The configuration of baffle 28 can be varied to tune the solid extracting means to maximum effectiveness and efficiency.

As has been previously stated relative to the lever arrangement in FIG. 1, many alternate means may be provided for positioning sleeve 56 of FIG. 2 to thereby alter the configuration of the conical baffle 28.

It can be seen that the means of varying the configuration of conical baffle 28 as disclosed in FIGS. 2 and 3 may be combined with means of varying the elevation of the baffle relative to the gas flow chamber 16 as shown in FIG. 1 if desired to provide an arrangement affording maximum variable control of the parameters and relationships of the scrubbing device.

While the invention has been described with a great degree of particularity it is manifest that many changes may be made in the details of construction and the arrangement of components without departing from the spirit and scope of this disclosure. It is understood that the invention is not to be limited to the abstract herein, nor the embodiments which have been described for the purpose of exemplifying the invention, but the invention is to be limited only by the scope of the attached claim or claims, including the full range of equivalency to which each element thereof is entitled.

What I claim:

1. An apparatus for extracting solids from a gas stream comprising:
    an upright scrubbing column defining an internal circular gas flow chamber;
    an inlet gas flow conduit connecting to said scrubbing column at the upper end thereof;
    an outlet gas flow conduit connecting to said scrubbing column at the lower end thereof, said outlet gas flow conduit defining, in part, a liquid collecting sump;
    a liquid inlet conduit intersecting said internal circular gas flow chamber of said scrubbing column substantially tangentially thereof whereby liquid introduced through said inlet wets the surface of said gas flow chamber;
    a truncated conical baffle supported coaxially of and within said gas flow chamber, the largest diameter of said conical member being less than the internal diameter of said gas flow chamber defining an annular passageway through which the downward flow of gas passes, said conical baffle having a vertical axial opening therethrough; and
    a liquid spray conduit communicating with the lower end of said conical baffle opening whereby liquid may be injected upwardly through said conical member to form a fountain contacted by the downward flow of gas whereby the solids in the gas stream are contacted with and carried off by the liquid.

2. An apparatus for extracting solids from a gas stream according to claim 1 wherein said internal circular gas flow chamber in said scrubbing column is defined by a constructed internal diameter venturi forming portion, said conical baffle being positioned in said venturi forming portion.

3. An apparatus for extracting solids from a gas stream according to claim 1 wherein said conical baffle is removably attached to said liquid conduit whereby conical baffles of different maximum diameters may be utilized to vary the area of said annular passageway.

4. An apparatus for extracting solids from a gas stream according to claim 1 wherein the height of said conical baffle relative to said internal gas flow chamber may be varied by means externally of said scrubbing column.

5. An apparatus for extracting solids from a gas stream according to claim 1 wherein the maximum diameter of said conical baffle may be varied by means controllable externally of said scrubbing column.

6. An apparatus for extracting solids from a gas stream according to claim 1 wherein said conical baffle includes:
    a base member affixed to the upper end of said liquid spray conduit and having a central opening therein for the passage of fluid upwardly therethrough to form a fountain;
    a plurality of relatively thin leaf members each having an upper edge, a lower edge of length greater than the upper edge and downwardly extending sides diverging outwardly between said upper and lower edges;

hinge means pivotally supporting said upper edge of each of said leaf members to said base members, said leaf members being supported in overlapping relationship and forming a substantially frustoconical surface having said liquid spray conduit as an axis; and means for simultaneously varying the angle of inclination of each of said leaf members whereby the maximum diameter defined by said substantially frustoconical surface formed by said leaf members may be varied to vary the area of said annular passageway.

7. An apparatus for extracting solids from a gas stream according to claim 6 wherein said means of simultaneously varying the angle of inclination of each of said leaf members comprises:

a sleeve slidably received on said liquid spray conduit below said base member;

a pivot link for each of said leaf members, each of said pivot members being pivotally supported at one end to said sleeve and at the other end to one of said leaf members whereby as said sleeve is raised each of said leaf members is pivoted outwardly at an increased angle relative to said spray conduit whereby said substantially frustoconical surface formed by said leaf members has an increased maximum diameter and contrarily, when said sleeve is lowered said maximum diameter is reduced; and means extending externally of said scrubbing column for raising and lowering said sleeve.

8. An apparatus for extracting solids from a gas stream according to claim 6 wherein said scrubbing column has an opening in the side wall thereof and wherein said means extending externally of said scrubbing column for raising and lowering said sleeve comprises:

a lever received and pivotally supported in said opening, the end of the portion of the lever extending within said scrubbing column being pivotally affixed to said sleeve, the portion of said lever extending exteriorly of said scrubber column serving as a handle portion for raising and lowering said sleeve.